United States Patent
Lection et al.

(10) Patent No.: US 10,112,298 B2
(45) Date of Patent: Oct. 30, 2018

(54) ASSIGNING TASKS TO A ROBOT DEVICE FOR EXECUTION

(71) Applicant: INTERNATIONAL BUSINESS MACHINES CORPORATION, Armonk, NY (US)

(72) Inventors: David B. Lection, Raleigh, NC (US); Sarbajit K. Rakshit, Kolkata (IN); Mark B. Stevens, Austin, TX (US); John D. Wilson, League City, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 135 days.

(21) Appl. No.: 15/232,028

(22) Filed: Aug. 9, 2016

(65) Prior Publication Data
US 2018/0043532 A1 Feb. 15, 2018

(51) Int. Cl.
*B25J 9/16* (2006.01)
(52) U.S. Cl.
CPC ........... *B25J 9/1661* (2013.01); *B25J 9/1697* (2013.01); *G05B 2219/23258* (2013.01); *G05B 2219/40099* (2013.01); *Y10S 901/01* (2013.01)
(58) Field of Classification Search
CPC ...... B25J 9/1661; B25J 9/1689; B25J 9/1697; B25J 11/008–11/009; B25J 13/08; G05B 2219/23258; G05B 2219/23254; G05B 2219/40099; G05B 2219/40108; G05B 2219/40113; G05B 2219/40114; G05B 2219/40097
See application file for complete search history.

(56) References Cited

U.S. PATENT DOCUMENTS

| | | | |
|---|---|---|---|
| 6,463,343 B1 | 10/2002 | Emens et al. | |
| 2004/0019405 A1* | 1/2004 | Ban | B25J 9/1697 700/213 |
| 2011/0093418 A1 | 4/2011 | Kwok | |
| 2014/0303775 A1* | 10/2014 | Oh | G05D 1/0016 700/253 |
| 2016/0167234 A1 | 6/2016 | Angle et al. | |
| 2017/0265703 A1* | 9/2017 | Park | A47L 9/2857 |

OTHER PUBLICATIONS

Attamimi et al., "Visual Recognition System for Cleaning Tasks by Humanoid Robots", 2013, International Journal of Advanced Robotic Systems, vol. 10, 384 (Year: 2013).*
Mashable, "Android Tablet Drives Bomb Squad Robot | Mashable", Oct. 8, 2014, Youtube, https://www.youtube.com/watch?v=dc_Yn6NfmhA (Year: 2014).*

* cited by examiner

*Primary Examiner* — Spencer D Patton
(74) *Attorney, Agent, or Firm* — Griffiths & Seaton PLLC

(57) ABSTRACT

Embodiments for assigning tasks to a robot device by a processor. A target region may be selected from a displayed image of an image capturing device. One or more tasks may be defined according to a plurality of objects displayed within the target region such that the defined one or more tasks are arranged according to a task workflow. The defined one or more tasks may be communicated to a self-directed device thereby assigning the self-directed robot to perform the defined one or more tasks according to the task workflow.

17 Claims, 7 Drawing Sheets

US 10,112,298 B2

ASSIGNING TASKS TO A ROBOT DEVICE FOR EXECUTION

BACKGROUND OF THE INVENTION

Field of the Invention

The present invention relates in general to computing systems, and more particularly to, various embodiments for assigning tasks to a robot device using a computing processor.

Description of the Related Art

Computing systems may be found in the workplace, at home, or at school. Such computing systems may include fixed robot devices, such as within an automotive factory or production line. In this way, performance costs are controlled and maintained. Moreover, the computing systems can include an Internet of Things (IoT), which is the interconnection of computing devices scattered across the globe using the existing Internet infrastructure. IoT devices may be embedded in a variety of physical devices or products, such as home appliances, manufacturing devices, industrial printers, automobiles, thermostats, smart traffic lights, vehicles, buildings, etc.

SUMMARY OF THE INVENTION

Various embodiments for assigning tasks to a robot device by a processor, are provided. In one embodiment, by way of example only, a method for assigning tasks to a robot device, again by a processor, is provided. A defined target region may be selected from a displayed image of an image capturing device. One or more tasks may be defined in relation to a plurality of objects displayed within the defined target region such that the defined one or more tasks are arranged according to a task workflow. The defined one or more tasks may be communicated to a self-directed device thereby assigning the self-directed robot to perform the defined one or more tasks according to the task workflow.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
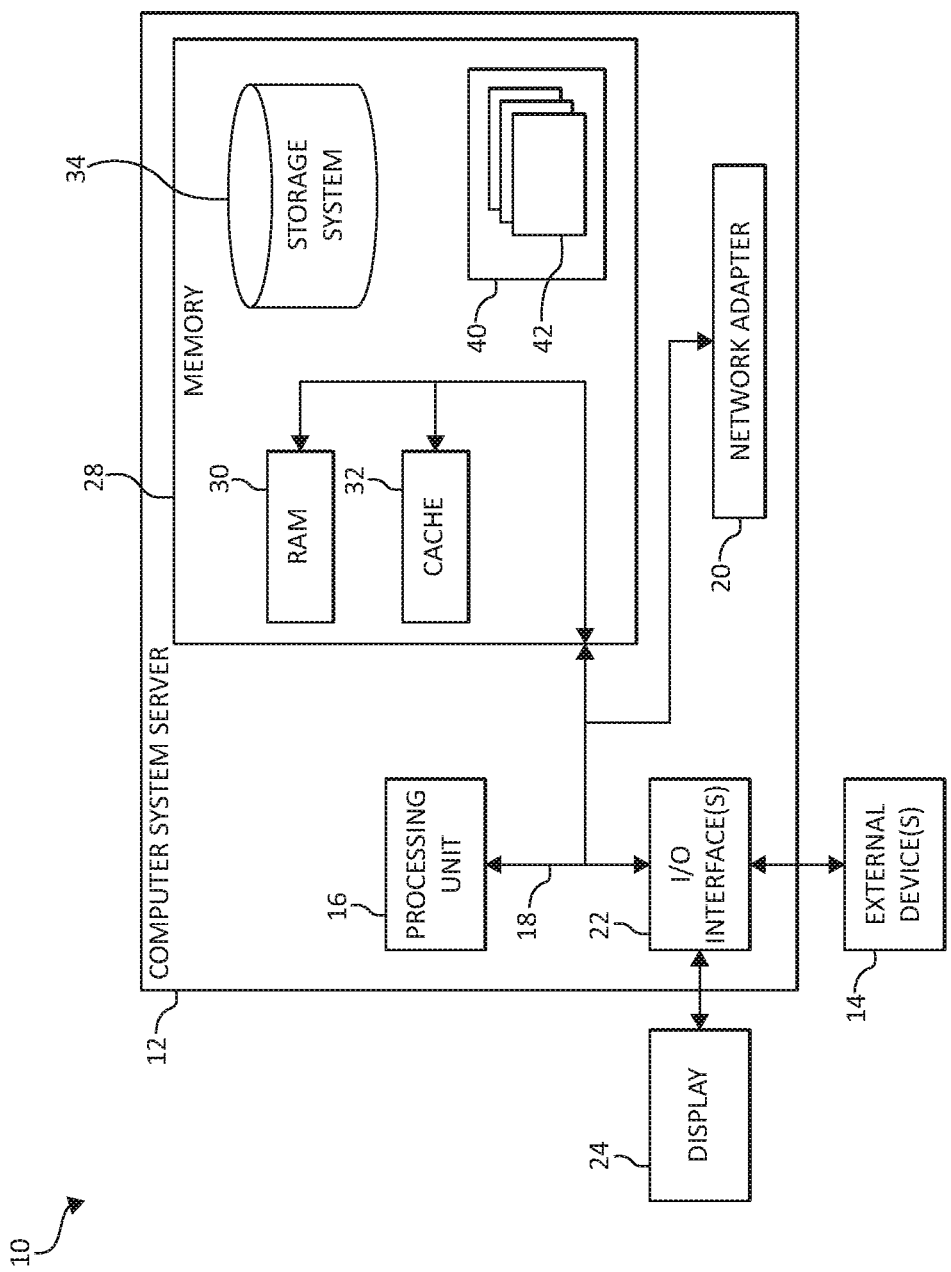
FIG. 1 is a block diagram depicting an exemplary cloud computing node according to an embodiment of the present invention.

With the prolific increase in use of IoT appliances in computing systems in a variety of settings, various beneficial uses may be found for assigning a self-directed mobile device, such as a robot device, to support daily life. The mechanisms of the present invention provide useful, novel functionality for a self-directed mobile device, such as a robot device, to perform one or more tasks such that the operation of the self-directed mobile device is controlled, updated, and automated by use of one or more commands provided by an image capturing device connected to the self-directed mobile device.

In one aspect, a target or "boundary" region may be selected from a displayed image of an image capturing device. One or more tasks may be defined in relation to a plurality of objects displayed within the defined target region such that the defined one or more tasks are arranged according to a task workflow. The defined one or more tasks may be communicated to a self-directed mobile device, such as, for example a robot device, thereby assigning the self-directed mobile device to perform the defined one or more tasks according to the task workflow.

The mechanisms of the illustrated embodiments may assign, to a robot device, one or more tasks or subtasks from one or more boundary regions. In one aspect, an image capturing device is focused on one or more targeted areas within a selected location (e.g., a home, business, and the like). One or more boundary areas (e.g., a target area) may be selected by drawing on the image capturing device a mark (e.g., a circle) where one or more appropriate tasks are to be assigned and performed by the robot device. After the boundary area is marked (e.g., drawn using a circle), one or more tasks and/or instructions for performing a task may be input into the image capturing device. That is, a user may enter text data (e.g., natural language text data) on the image capturing device that defines the specific and customizable tasks or subtasks to be performed by the robot device. Thus, the natural language text data may be combined with the drawing of the selected target area boundaries using the captured image to enable the robot to perform the defined tasks. In one aspect, the one or more tasks and/or instructions may include at least washing, cleaning, sweeping, dusting, organizing, tasks associated with household chores, tasks associated with a business, tasks associated with care facilities (e.g., nursing home/hospital), and/or a variety of tasks or chores which may be defined by a user.

The one or more tasks and/or instructions may be analyzed and interpreted using a list of tasks and/or instructions or ontological data associated with the tasks or subtasks so as to identify and interpret the one or more tasks and/or instructions to be performed by the robot device. In one aspect, the text data itself or words or phrases extracted from the text data may be defined according to a task or keyword dictionary or thesaurus. In an additional aspect, a lexical database ontology may be used to interpret and analyze the text data itself or words or phrases extracted from the text data. Also, the lexical database ontology may also be used to provide textual analysis to disambiguate textual content being analyzed to interpret the text data itself or words or phrases extracted from the text data.

Also, a workflow for execution may also be created for the assigned tasks. The assigned tasks may also be scheduled to be performed by the robot device at a selected time or upon occurrence of a defined event. In an additional aspect, multiple target boundaries may also be selected (e.g., selected locations in different regions of the displayed image) within the display device of an image capturing device. The one or more tasks and/or instructions may be communicated to the robot device, having instruction embedded therein, to enable the robot device to identify, interpret, and perform each one of the assigned tasks, which may be sequentially performed according to a selected time period, condition, or event. That is, the input data captured on the image capturing device may be sent to the robot device, along with the captured image having the selected target region, to enable the robot device to interpret, analyze, and/or perform the tasks.

The mechanisms of the illustrated embodiments may assign, to a robot device, one or more tasks or subtasks from one or more boundary regions marked on a touch screen of an image capturing device. In one aspect, an image capturing device may be focused on one or more targeted areas within a selected location (e.g., a home, business, and the like). One or more boundary areas (e.g., target areas) may be selected by drawing on the image capturing device a mark (e.g., a circle) where appropriate task is to be assigned and performed for the robot device. After the boundary area is marked (e.g., drawn), one or more tasks and/or instructions for performing a task may be input into the image capturing device. For example, image capturing instructions for performing the defined one or more tasks according to the plurality of objects may be input into the image capturing device using either text data or a selectable menu via a graphical user interface (GUI). A computing ecosystem associated with the image capturing device and a robot device may analyze the one or more tasks (e.g., written text) and the one or more tasks may be assigned to the robot. A robotic computing system associated with a robot device may identify the assigned task from the ecosystem and will sequence the tasks for execution by the robot device.

Data is increasingly processed through a variety of geographically disbursed computing components, where, for example, a local node may contain a set of data processing components yet remain in remote communication with other portions of the distributed data processing system. To wit, an image capturing device, a self-directed mobile device (e.g., a robot, and/or user's data may not be locally stored or processed on the user's local computer, but is instead hosted by one or more distributed storage components that are in remote communication with the local computer. This type of data storage may, in some cases, be referred to as "cloud," or "cloud-based" storage.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
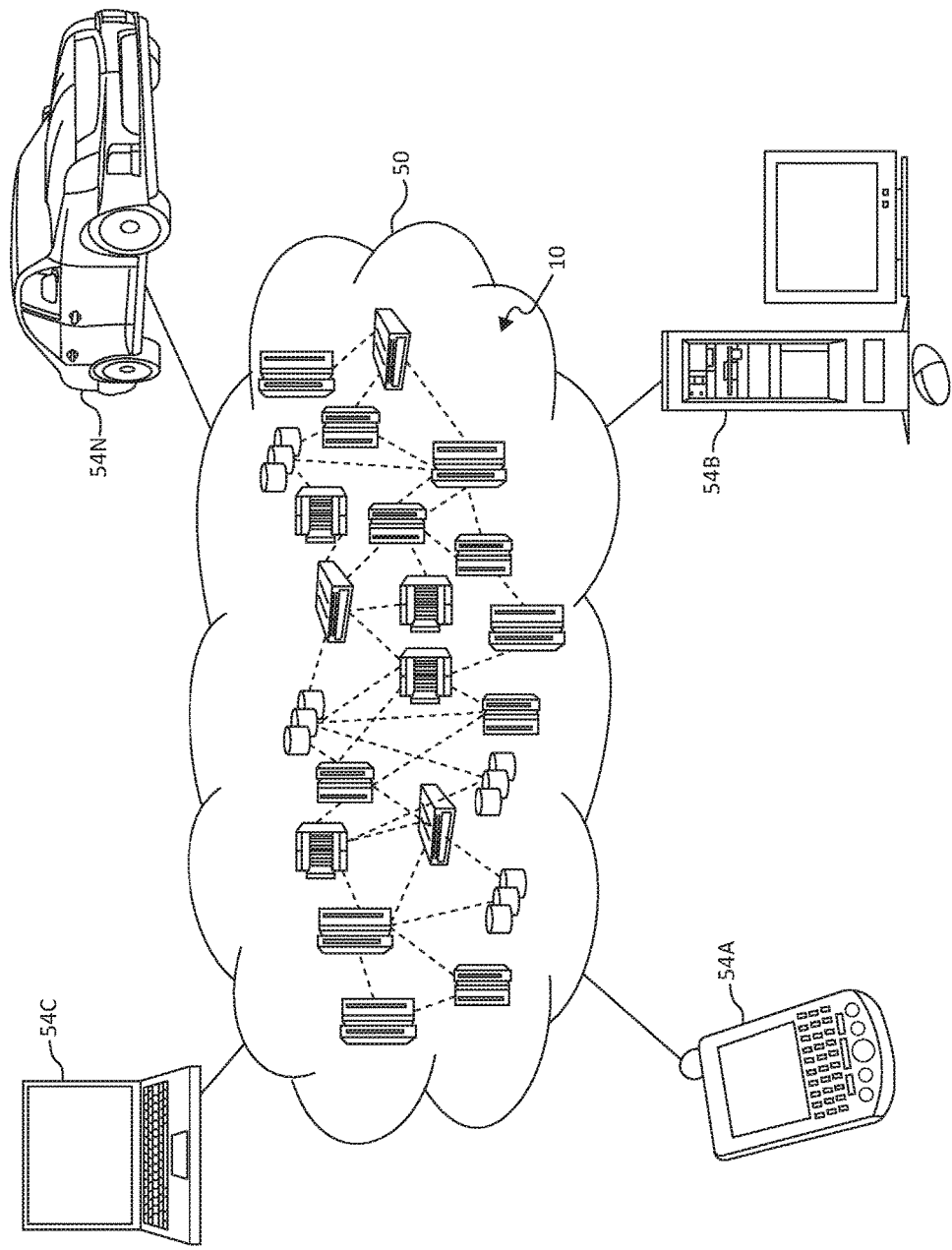
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
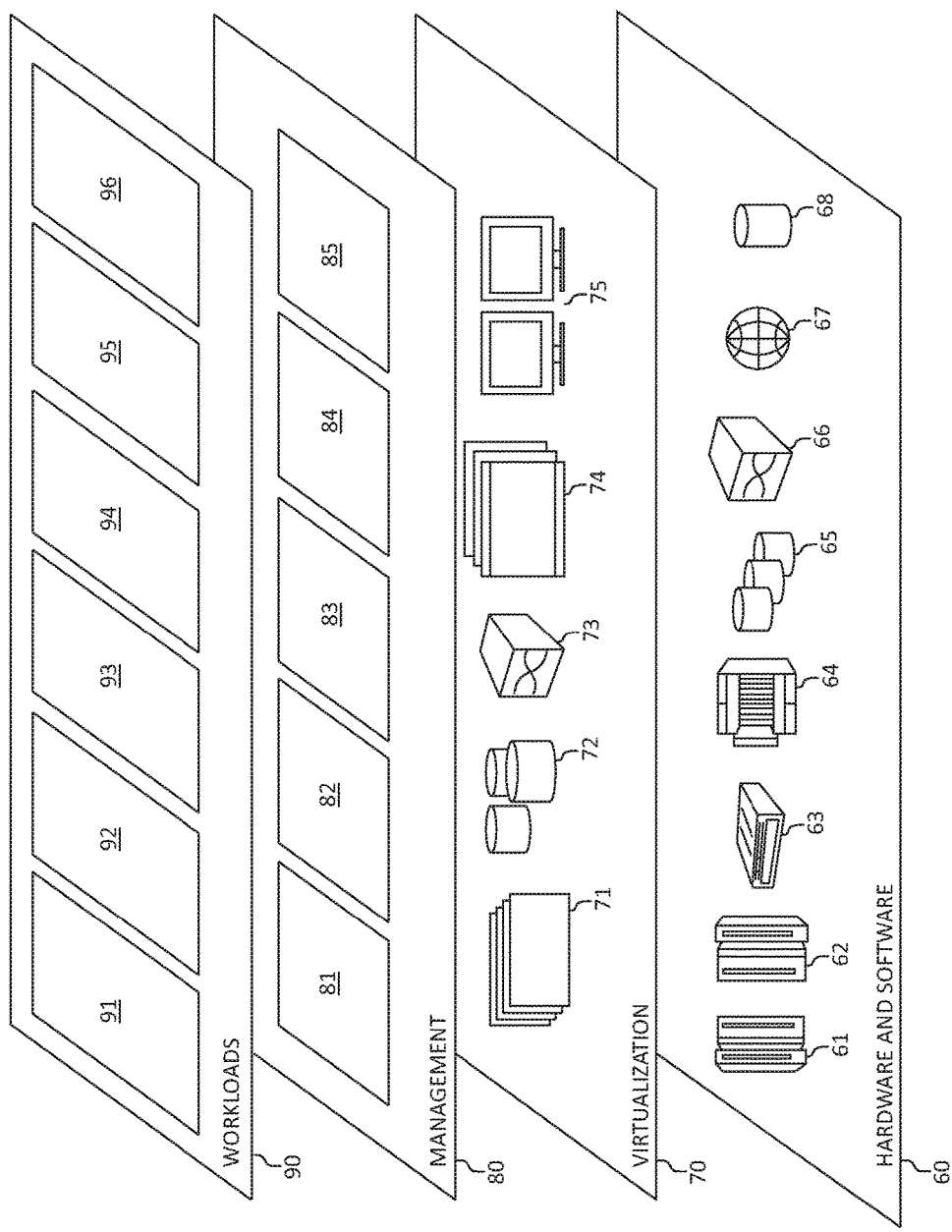
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various image processing and task assignment workloads and functions 96. In addition, image processing and task assignment workloads and functions 96 may include such operations as target area analytics, task assignment analysis, and as will be further described, image device and robot device management functions. One of ordinary skill in the art will appreciate that the image processing and task assignment workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the improvement of task selection and assignment for robot devices via target areas having defined tasks within a displayed image (video, photos, etc.) by, among other aspects, automated remote configuration ("remote control") of robot device settings, positioning, and other factors based, at least in part, on data obtained from the same image subjects previously recorded, such as, for example the defined tasks within target areas of a captured image of the image capturing device.

In one embodiment, the configuration settings to enable a robot to perform a task may be based on a variety of task assignments, metadata, and captured image information. This information may include among other details, for example, the type of image capturing device, time of photography, focal length setting, shutter speed setting, lens and lens size information, two-dimensional (2D) object data, three-dimensional (3D) object data, and touch screen capability and functionality.

Figure 4:
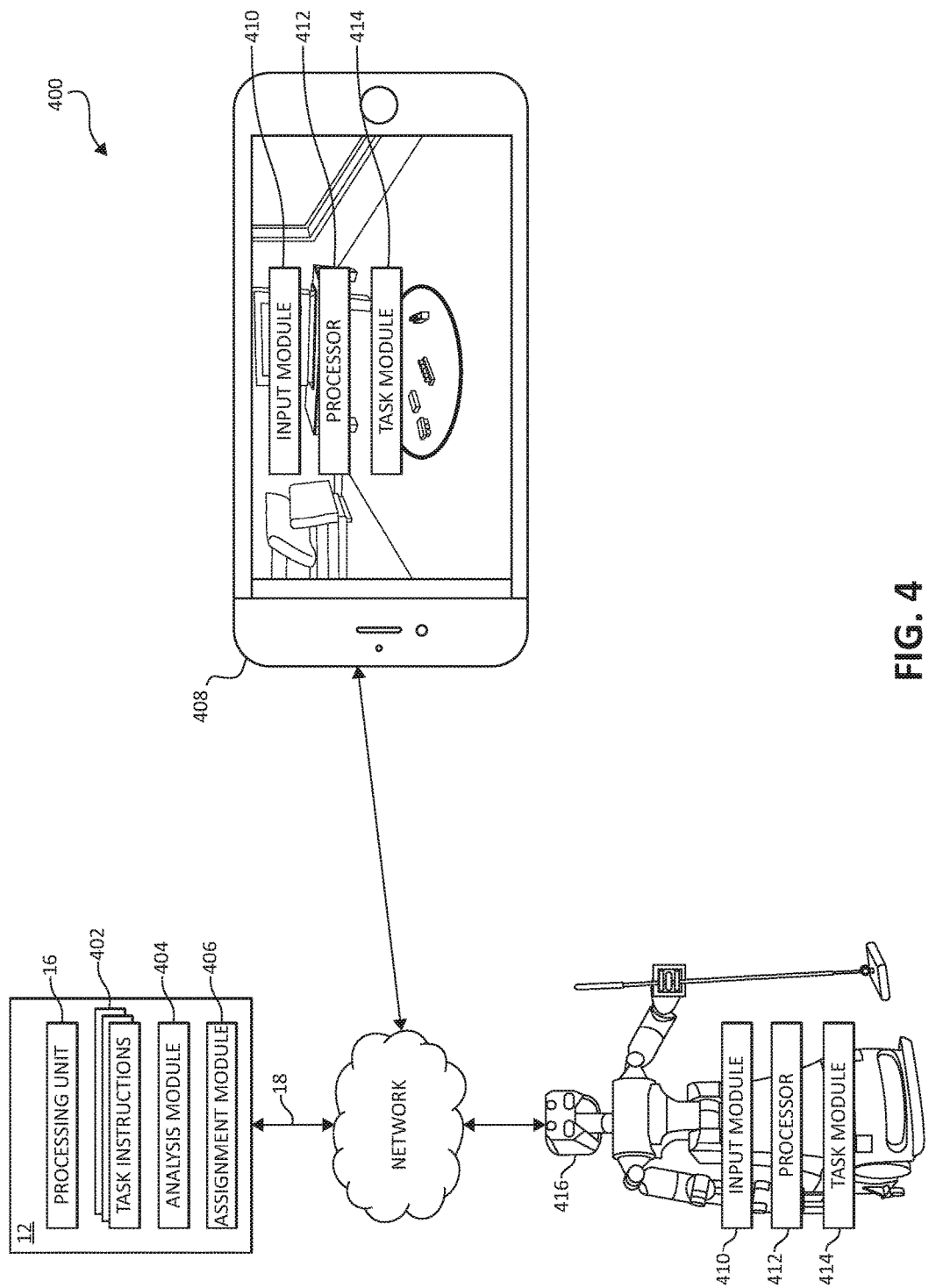
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. Computer system/server 12 is again shown, incorporating processing unit 16 to perform various computational, data processing and other functionality in accordance with various aspects of the present invention. A database of task instructions (e.g., a knowledge domain or ontology) 402 is shown, along with an analysis module 404 and an assignment module 406.

As one of ordinary skill in the art will appreciate, the depiction of the various functional units in computer system/server 12 is for purposes of illustration, as the functional units may be located within computer system/server 12 or elsewhere within and/or between distributed computing components. The task instructions 402 may include a data repository of various tasks or chores or/and additional metadata information that is obtained from previously obtained images and defined tasks or chores. The images themselves may also be stored in a corresponding database, which is not shown for purposes of illustrative convenience.

Analysis module 404 and assignment module 406 may work in concert with processing unit 16 to accomplish various aspects of the present invention. For example, analysis module 404 may undergo various data analytics functions associated with the task instructions 402 to identify and/or interpret a defined task that may be new and/or associated with previously stored task instructions or images. The analysis module 404 may also interpret a relative position of each selected object relative to each other and non-selected objects within or without the target region of a captured image that is associated with the defined tasks. Assignment module 406 may make decisions in conjunction with the analysis module 404 to identify, select, and provide additional tasks, if needed, to enable the robot device to perform the defined tasks and instructions, or in another embodiment. As one of ordinary skill in the art will appreciate, the assignment module 406 and analysis module 404 may implement mathematical modeling, image processing, or other data processing technologies to carry out the various mechanisms of the illustrated embodiments.

FIG. 4's components 400 as shown may have an image capturing or recording device, such as image capturing device 408 and a robot device 416. In one aspect, the image capturing device may include a smart phone, video camera, a camera, a tablet, computers, handheld devices, IoT device and the like. The image capturing device 408 and robot device 416 are connected via communications channels (e.g., bus 18) through the network to the computer system/server 12 as shown. In one exemplary embodiment, a user may find themselves in a location where they desire to take a photo. The camera 408 of the user may have already located, and connected to, a wireless network. The camera 408 may then connect through the local wireless network through the Internet to the computer system/server 12 to provide context metadata and, in turn, receive settings information and/or instructions from the computer system/server 12.

The image capturing device 408 and robot device 416 may incorporate additional functional components 400 such as the depicted input module 410, processor 412, and task module 414 (e.g., task selection and/or task execution module). Here again, the use of an input module 410 and task module 414 are merely for illustrative convenience as a variety of functional components 400 may be integrated into the cameras 408 and 416 to accomplish specific functionality to further the mechanisms of the illustrated embodiments.

Input module 410 may, in one embodiment, serve to receive image information provided by the image capturing device 408 and robot device 416. For example, once the user snaps a candidate image, the input module 410 may receive input commands or selected target region data from text, markings and/or commands input into a touch screen or graphical user interface (GUI). For example, a menu option displaying a menu and/or list of a variety of tasks or subtasks via the GUI on the image capturing device 408 may be used to select the tasks or subtasks. The input module 410 may separate the commands from the image to be provided to the computer system/server 12. The relative position may also be provided through the input module 410 by a user's own input, or by other devices, such as 2D and/or 3D imaging and positioning model or sensors or Global Positioning System (GPS) sensor devices to indicate location. A variety of input data may pass through the input module 410 to be processed by the computer system/server 12.

In similar fashion, the task module 414 may function for task communication between the image capturing device 408 and robot device 416, so for example, when the image capturing device 408 communicates to the computer system/server 12, the computer system/server 12 provides to the task module 414 on the robot device the target areas, tasks, instructions, images, and/or object positioning data, or other data. The computer system/server 12 may provide such data as saved task instructions, task assignments, defined tasks according to the task workflow, or a variety of other data that may pass through and be received by the task module 414. The task module 414 may query or provide a menu option to a user, in one embodiment, whether they wish to provide, update, define, change one or more target areas, objects within the target area, tasks and instructions, and/or provide other configurations and ontological data in association with the tasks on the image capturing device 408 and robot device 416. This functionality may be provided by a graphical user interface (GUI) on the image capturing device 408, which provides information to/from the computer system/server 12 and/or robot device 416, or receives input and/or selection data from the user.

Figure 5:
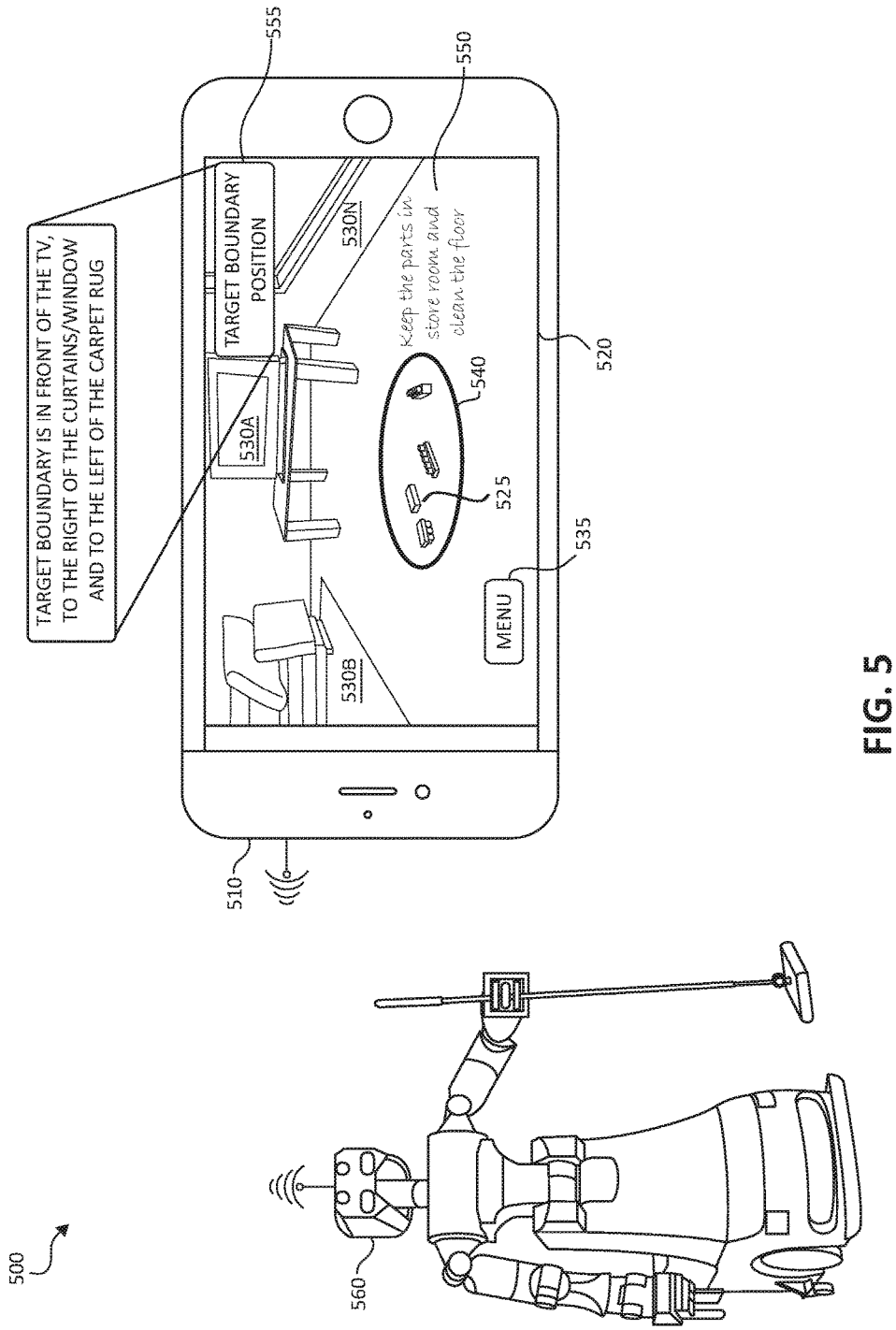
FIG. 5 is an additional block diagram depicting an exemplary functional relationship between various aspects of the present invention.

Turning now to FIG. 5, a block diagram depicting an exemplary functional relationship 500 between various aspects of the present technology is depicted. In one aspect, each of the devices, components, modules, and/or functions described in FIGS. 1-4 may also apply to the devices, components, modules, and functions of FIG. 5. Also, one or more of the operations and steps of FIGS. 1-4 may also be included in one or more operations or actions of FIG. 5. For example, although not explicitly depicted in FIG. 5, one or more of the computer system/server 12 of FIG. 1, may incorporate processing unit 16 to perform various computational, data processing and other functionality in accordance with various aspects of the present technology. Furthermore, the devices, components, modules, and/or functions described in FIG. 5 may also contain communication connections or networking apparatus and networking connections that allow the devices to communicate with other devices.

In one aspect, FIG. 5 depicts the functional relationship between an image capturing device 510 and a self-directed mobile device 560 (e.g., robot device). In one aspect, the image capturing device 510 is in direct and/or indirect (e.g., via cloud computing) communication with the robot device 560 via one or more communication networks (not depicted for illustrative convenience) that may utilize a variety of protocols such as a wireless link utilizing a wireless protocol such as WIFI, Bluetooth™, Radio Frequency (RF), Infrared, etc. The communication links may transmit electrical, electromagnetic or optical signals, which carry digital data streams, or analog signals representing various types of information.

In one aspect, the image capturing device 510 may include a touch screen 520 (or GUI) capable of receiving one or more inputs, marks, texts, or commands via "touch" or "marks" (e.g., target area 540 and tasks 550 or "tasks instructions") to the touch screen 520. The touch screen 520 may include a menu option 535 enabling one or more instructions or "tasks 550" to be entered or selected. The image capturing device may include a target boundary position 555 capable of identifying, displaying and providing (either audible and/or visual) a relative position of one or more objects 525 relative to each other and other non-selected objects 530a-n (herein after individually or collectively "530). For example, the target boundary position 555 may indicate that the target area 540 includes objects 525 and that the target area is located in front of the object 530a ("TV"), just to the right of object 530n ("curtains/window") and to the left of the object 530b ("carpet rug").

In operation, the target area 540 displayed within the image capturing device 510 may be selected. One or more tasks 550 may be defined and/or selected on the image capturing device to enable the robot device to perform the tasks. The tasks 550 within the target area 540, along with the image, relative position data, and/or metadata associated therewith may be communicated to the robot device such that the communication includes one or more instructions to execute each defined task by the robot device in the target area 540.

Consider the following example of an implementation of the aforementioned functionality. In one aspect, the image capturing device 510 focuses on an area, such as a living room within a home or office. The image capturing device 510 captures the focused image (e.g., live or still) enabling a user to select (aka "draw") a target area 540. For example, the target area 540 has been circled on the touch screen 520. As required by a user, the user can also focus the image capturing device 510 in multiple places and draw multiple target areas where actions and/or tasks are to be performed by the robot device 560.

The target area 540 may be the boundary area where objects 525 are associated with the tasks 550 (and/or subtasks) within the target area 540 and tasks or subtasks are to be performed by the robot device 560. In one aspect, the tasks 550 (including instructions and/or associated activities) are also marked or defined on the touch screen 520 of the image capturing device 510. In one aspect, the tasks 550 may be one or more actions that are entered as written text and displayed on the touch screen 520. For example, the tasks 550 or "written text" data may indicate "Keep the parts in store room and clean the floor". Here, the user wants to clean the selected boundary and wants to keep the parts (e.g., objects 525) in a store room (not featured for illustrative convenience). In one aspect, a user of the image capturing device 510 may also provide scheduling information relating to performing the tasks 550. The scheduling information may be based on a selected time period and/or event based.

As required by a user, the user can also focus the image capturing device 510 in multiple places and draw multiple target areas where actions and/or tasks are to be performed by the robot device 560. Moreover, objects 525 (or items) within the boundary (e.g., target area 540) may be tagged and associated with the defined tasks. In an additional aspect, objects 525 (or items) within the target area 540 may be tagged as part of the IoT system, tagged and associated with the defined tasks, and have metadata and/or positioning data associated with the objects 525 as to their location and other handling. In one aspect, a sequence of tasks or activities associated with the tasks may be ranked or classified according to priority, and/or timing. A workflow of the sequence of tasks or activities associated with the tasks may also be created.

In an additional aspect, the menu option 535 system, or other selection means may be provided on the touch screen 520 in order to select the tasks 550 in the target area 540 that the robot device 560 can interpret, analyze, and execute according to the selected tasks and/or activities associated with the tasks. Data and images collected on the image capturing device 510 may be communicated or sent to an "ecosystem", such as, for example, a central server, a cloud computing network, and/or a local area network server, and/or directly to a computing system capable of receiving the communicated data and images associated with the robot device or installed thereon. In one aspect, the central server, the cloud computing network, the local area network server, and/or the computing system of the robot device may analyze the data, metadata, and/or images and to identify the target area 540 (e.g., boundary location), the relative position of objects 525 (e.g., the target boundary position 555 of the objects 525), the tasks 550 (e.g., written text or selected tasks from the menu option 535).

In one aspect, the image capturing device 510, the central server, the cloud computing network, the local area network server, and/or the computing system of the robot device 560 may analyze the 2D images to identify a relative position of the target area 540 and/or the objects 525. The analysis of the 2D images may be identified according to a comparative position analysis and displayed in the target boundary position 555. Once the relative position of the objects 525 and/or target area 540 are identified based on relative position analysis, the marks and/or selected menu tasks (e.g., tasks 550 and associated activities, subtasks, and/or instructions) may be analyzed to identify the assigned tasks and instructions.

For example, one or more extracted keywords from the text data may be identified and/or interpreted with a keyword dictionary or ontology (e.g., a lexical database ontology), which may be associated with the central server, the cloud computing network, the local area network server, and/or the computing system of the robot device. In a similar fashion, identified objects 525 within the target area 540 may also be identified and/or interpreted with the keyword or objet dictionary or ontology, which may be associated with the central server, the cloud computing network, the local area network server, and/or the computing system of the robot device. Furthermore, if multiple tasks 550 are assigned within the target area 540, the identified and defined workflow may be executed by the robot device according to a workflow list.

Figure 6:
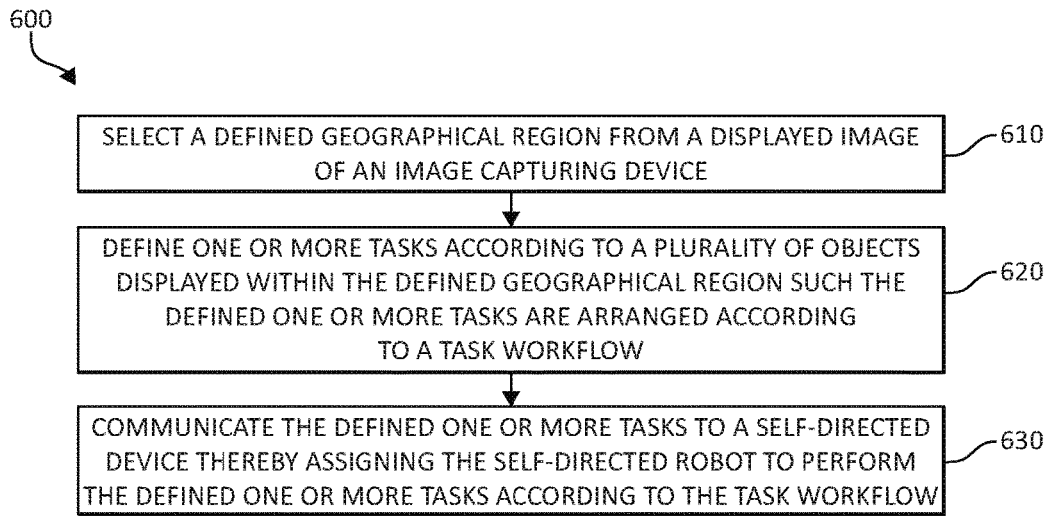
FIG. 6 is a flowchart diagram depicting an exemplary method for assigning tasks to a robot device by a processor, in which aspects of the present invention may be realized.

Turning now to FIG. 6, a method 600 for assigning tasks to a robot device by a processor is depicted, in which various aspects of the illustrated embodiments may be implemented. The functionality 600 may be implemented as a method executed as instructions on a machine, where the instructions are included on at least one computer readable medium or one non-transitory machine-readable storage medium. Starting in block 610, a defined target region may be selected from a displayed image of an image capturing device. One or more tasks may be defined according to a plurality of objects displayed within the defined target region such that the defined one or more tasks are arranged according to a task workflow, as in block 620. The defined one or more tasks may be communicated to a self-directed device thereby assigning the self-directed robot to perform the defined one or more tasks according to the task workflow, as in block 630.

Figure 7:
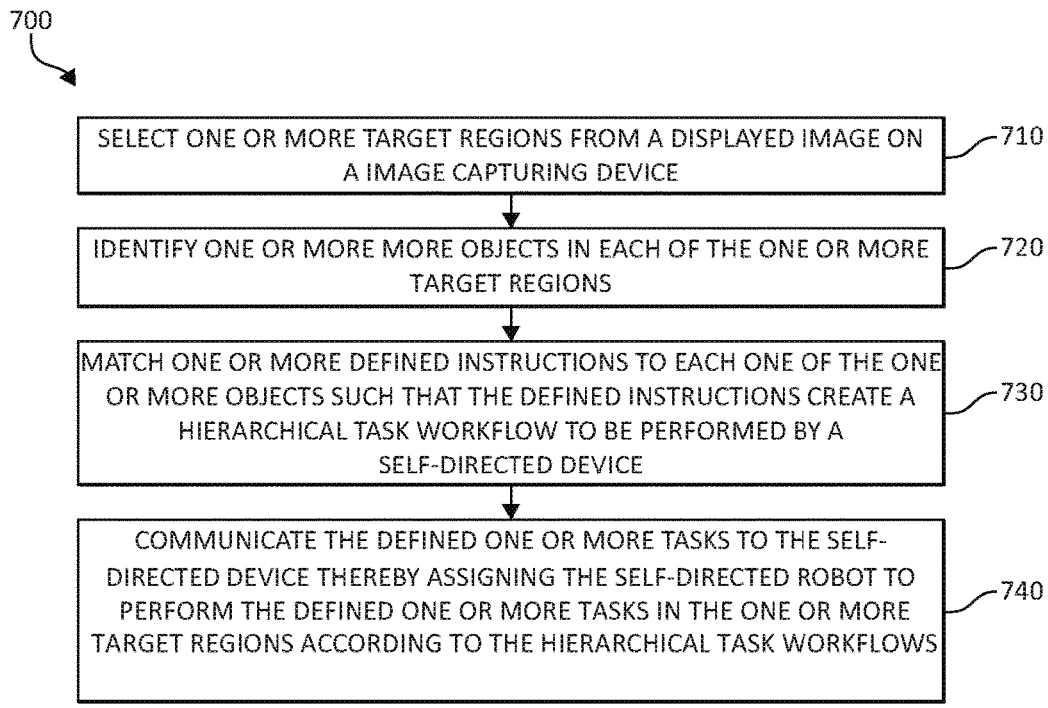
FIG. 7 is an additional flowchart diagram depicting an additional exemplary method for assigning tasks to a robot device by a processor, again in which aspects of the present invention may be realized.

Turning now to FIG. 7, a method 700 for assigning tasks to a robot device by a processor is depicted, in which various aspects of the illustrated embodiments may be implemented. That is, FIG. 7 is a flowchart of an additional example method 700 for enforced registry of cookies in tiered delivery network of a computing environment according to an example of the present technology. The functionality 700 may be implemented as a method executed as instructions on a machine, where the instructions are included on at least one computer readable medium or one non-transitory machine-readable storage medium. Starting in block 710, one or more target regions may be selected from a displayed image of an image capturing device. One or more objects may be identified and/or selected in each of the one or more target regions, as in block 720. In one aspect, the identification includes performing position comparison analysis so as to identify the position of each of the objects relative to each other and other non-selected objects. One or more defined instructions are matched to each one of the one or more objects such that the defined instructions create hierarchical task workflows to be performed by a self-directed device (e.g., a robot device), as in block 730. The defined one or more tasks may be communicated to a self-directed device thereby assigning the self-directed device to perform the defined one or more tasks in the one or more target regions according to the hierarchical task workflows, as in block 740.

Figure 8:
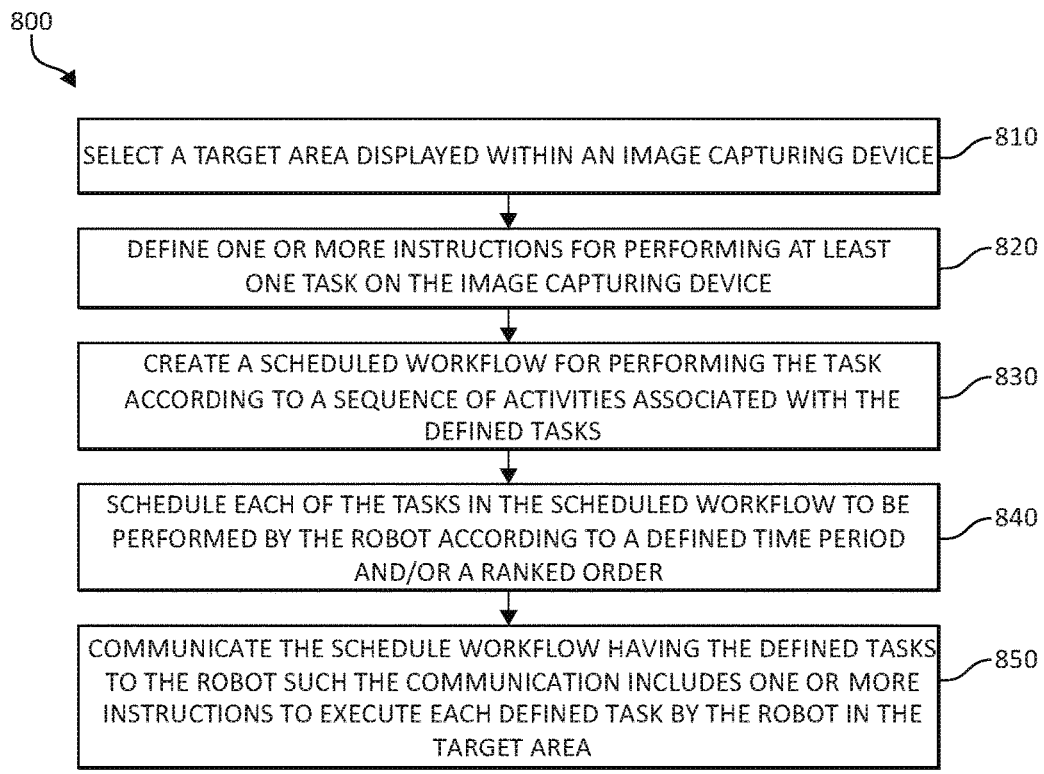
FIG. 8 is an additional flowchart diagram depicting an exemplary method for assigning tasks to a robot device by a processor; again in which aspects of the present invention may be realized.

Turning now to FIG. 8, a method 800 for assigning tasks to a robot device by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. Starting in block 810, a target area displayed within an image capturing device is selected. For example, depending on the functionality of the image capturing device, the target area may be drawn or on a display screen or a graphical user interface of the image capturing device or on a display screen of a display device associated with the image capturing device, that is capable of receiving an input to draw a circle around the target area where the robot will execute the defined tasks. For example, a menu system, or other selection means may be used to select the tasks that the robot can perform rather than text data. One or more instructions are defined (e.g., text is input into the display) for performing at least one task on the image capturing device, as in block 820. In one aspect, the tasks and/or instructions may be defined and/or interpreted using a task definition or keyword database and/or using a lexical database ontology. A scheduled workflow for performing the task may be created according to a sequence of activities associated with the defined tasks, as in block 830. Each of the tasks in the scheduled workflow may be scheduled to be performed by the robot according to a defined time period and/or a ranked order, as in block 840. The schedule workflow, having the defined tasks, is communicated to the robot device such that the communication includes one or more instructions to execute each defined task in the target area, as in block 850.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, performed by a processor, for assigning tasks to a robot device, comprising:
   selecting a target region from a displayed image of an image capturing device;
   defining one or more tasks in relation to a plurality of objects displayed within the target region such that the defined one or more tasks are arranged according to a task workflow;
   wherein defining the one or more tasks further includes inputting image capturing instructions for performing the defined one or more tasks and one or more subtasks of the one or more tasks according to the plurality of objects using text data via a graphical user interface (GUI) such that a user inputs natural language text into the GUI to define the one or more tasks; and
      communicating the defined one or more tasks to a self-directed device thereby assigning the self-directed device to perform the defined one or more tasks according to the task workflow.

2. The method of claim 1, further including associating each one of the defined one or more tasks to each one of the plurality of objects within the target region.

3. The method of claim 1, further including tagging each of the plurality of objects displayed within the target region.

4. The method of claim 1, further including providing instructions for performing the defined one or more tasks to enable the self-directed device to perform the defined one or more tasks.

5. The method of claim 1, further including scheduling each of the defined one or more tasks arranged in the task workflow to be performed by the self-directed device at a selected period of time, wherein the self-directed device is a robot device.

6. The method of claim 1, further including identifying a relative position of each of the plurality of objects in relation to each other within the target region.

7. A system for assigning tasks to a robot device, comprising:
   one or more computers with executable instructions that when executed cause the system to:
      select a target region from a displayed image of an image capturing device;
      define one or more tasks according to a plurality of objects displayed within the target region such that the defined one or more tasks are arranged according to a task workflow;
   wherein defining the one or more tasks further includes inputting image capturing instructions for performing the defined one or more tasks and one or more subtasks of the one or more tasks according to the plurality of objects using text data via a graphical user interface (GUI) such that a user inputs natural language text into the GUI to define the one or more tasks; and
      communicate the defined one or more tasks to a self-directed device thereby assigning the self-directed device to perform the defined one or more tasks according to the task workflow.

8. The system of claim 7, wherein the executable instructions further associate each one of the defined one or more tasks to each one of the plurality of objects within the target region.

9. The system of claim 7, wherein the executable instructions further tag each of the plurality of objects displayed within the target region.

10. The system of claim 7, wherein the executable instructions further provide instructions in the communication for performing the defined one or more tasks to enable the self-directed device to perform the defined one or more tasks.

11. The system of claim 7, wherein the executable instructions further schedule each of the defined one or more tasks arranged in the task workflow to be performed by the self-directed device at a selected period of time, wherein the self-directed device is a robot device.

12. The system of claim 7, wherein the executable instructions further identify a relative position of each of the plurality of objects in relation to each other within the target region.

13. A computer program product for, by a processor, assigning tasks to a robot device, the computer program product comprising a non-transitory computer-readable storage medium having computer-readable program code portions stored therein, the computer-readable program code portions comprising:
   an executable portion that selects a target region from a displayed image of an image capturing device;
   an executable portion that defines one or more tasks according to a plurality of objects displayed within the target region such that the defined one or more tasks are arranged according to a task workflow; wherein defining the one or more tasks further includes inputting image capturing instructions for performing the defined one or more tasks and one or more subtasks of the one or more tasks according to the plurality of objects using text data via a graphical user interface (GUI) such that a user inputs natural language text into the GUI to define the one or more tasks; and
   an executable portion that communicates the defined one or more tasks to a self-directed device thereby assigning the self-directed device to perform the defined one or more tasks according to the task workflow.

14. The computer program product of claim 13, further including an executable portion that:

associates each one of the defined one or more tasks to each one of the plurality of objects within the target region; and tags each of the plurality of objects displayed within the target region.

15. The computer program product of claim 13, further including an executable portion that provides instructions in the communication for performing the defined one or more tasks to enable the self-directed device to perform the defined one or more tasks.

16. The computer program product of claim 13, further including an executable portion that schedules each of the defined one or more tasks arranged in the task workflow to be performed by the self-directed device at a selected period of time, wherein the self-directed device is a robot device.

17. The computer program product of claim 13, further including an executable portion that identifies a relative position of each of the plurality of objects in relation to each other within the target region.

\* \* \* \* \*